US012093312B2

(12) United States Patent
Aher et al.

(10) Patent No.: US 12,093,312 B2
(45) Date of Patent: *Sep. 17, 2024

(54) SYSTEMS AND METHODS FOR PROVIDING SEARCH QUERY RESPONSES HAVING CONTEXTUALLY RELEVANT VOICE OUTPUT

(71) Applicant: ROVI GUIDES, INC., San Jose, CA (US)

(72) Inventors: Ankur Anil Aher, Maharashtra (IN); Harish Ashok Kumar, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,665

(22) Filed: Nov. 8, 2022

(65) Prior Publication Data
US 2023/0169112 A1 Jun. 1, 2023

Related U.S. Application Data

(63) Continuation of application No. 16/201,352, filed on Nov. 27, 2018, now Pat. No. 11,520,821.

(51) Int. Cl.
*G06F 16/635* (2019.01)
*G06F 16/9032* (2019.01)
*G06F 16/907* (2019.01)
*G10L 13/027* (2013.01)

(52) U.S. Cl.
CPC ...... *G06F 16/637* (2019.01); *G06F 16/90332* (2019.01); *G06F 16/907* (2019.01); *G10L 13/027* (2013.01)

(58) Field of Classification Search
CPC ............................ G06F 16/637; G06F 16/907

USPC ......................................................... 707/736
See application file for complete search history.

(56) References Cited

U.S. PATENT DOCUMENTS

| 8,170,196 | B2* | 5/2012 | Knott ................. G06Q 10/0639 706/62 |
| 9,229,974 | B1* | 1/2016 | Lee .......................... G06F 16/35 |
| 9,338,493 | B2* | 5/2016 | Van Os .............. H04N 21/4122 |
| 9,535,879 | B2* | 1/2017 | Allen .................... G06F 40/289 |
| 10,056,078 | B1* | 8/2018 | Shepherd .......... G06F 16/24578 |

(Continued)

FOREIGN PATENT DOCUMENTS

WO 2018193878 A1 10/2018

OTHER PUBLICATIONS

Meyers, "Google Assistant 101: How to Change the Voice of Android and iPhone to More Natural Male and Female Speakers, Smartphones: Gadget Hacks" Nov. 5, 2018 (6 pages).

(Continued)

*Primary Examiner* — Hosain T Alam
*Assistant Examiner* — Nicholas E Allen
(74) *Attorney, Agent, or Firm* — HALEY GUILIANO LLP

(57) ABSTRACT

Systems and methods are described for responding to a search query with a contextually relevant voice output. An illustrative method receives a search query, determines an answer to the search query, identifies a media content reference included in the search query, determines, based on the media content reference, a personality associated with the media content reference, identifies a voice profile of the personality, and generates audio output using the voice profile of the personality, the audio output including the answer to the search query.

20 Claims, 9 Drawing Sheets

(56) References Cited

U.S. PATENT DOCUMENTS

| | | | |
|---|---|---|---|
| 2007/0168359 A1 | 7/2007 | Jacob et al. | |
| 2008/0183678 A1 | 7/2008 | Weston et al. | |
| 2009/0281794 A1 | 11/2009 | Ben-Haroush et al. | |
| 2011/0270517 A1* | 11/2011 | Benedetti | H04W 4/18 715/730 |
| 2012/0265533 A1 | 10/2012 | Honeycutt | |
| 2014/0081633 A1 | 3/2014 | Badaskar | |
| 2014/0214785 A1 | 7/2014 | Edberg | |
| 2014/0359439 A1* | 12/2014 | Lyren | G06F 16/9538 707/706 |
| 2015/0052084 A1* | 2/2015 | Kolluru | G06T 13/40 706/11 |
| 2015/0081690 A1* | 3/2015 | Arom | G06F 16/68 707/728 |
| 2015/0178392 A1* | 6/2015 | Jockisch | G06F 16/9535 707/706 |
| 2015/0382047 A1* | 12/2015 | Van Os | H04N 21/4316 725/38 |
| 2016/0196265 A1* | 7/2016 | Allen | G06F 16/9535 707/734 |
| 2016/0378852 A1* | 12/2016 | Goldberg | G06F 16/3329 707/722 |
| 2017/0011745 A1* | 1/2017 | Navaratnam | G06F 3/017 |
| 2017/0090858 A1* | 3/2017 | Paris | G06F 16/638 |
| 2017/0161319 A1 | 6/2017 | Venkataraman et al. | |
| 2017/0186425 A1 | 6/2017 | Dawes et al. | |
| 2017/0247000 A1* | 8/2017 | Ricci | B60R 16/037 |
| 2017/0316782 A1 | 11/2017 | Haughay | |
| 2017/0364520 A1* | 12/2017 | Venkataraman | G10L 15/26 |
| 2018/0108343 A1* | 4/2018 | Stevans | G10L 13/00 |
| 2018/0241701 A1* | 8/2018 | Miyajima | H04L 51/02 |
| 2018/0293483 A1* | 10/2018 | Abramson | H04L 51/02 |
| 2019/0355372 A1 | 11/2019 | Bittner | |
| 2020/0167384 A1 | 5/2020 | Aher et al. | |

OTHER PUBLICATIONS

PCT International Search Report and Written Opinion for International Application No. PCT/US2019/063775, dated Mar. 31, 2020 (16 Pages).

* cited by examiner

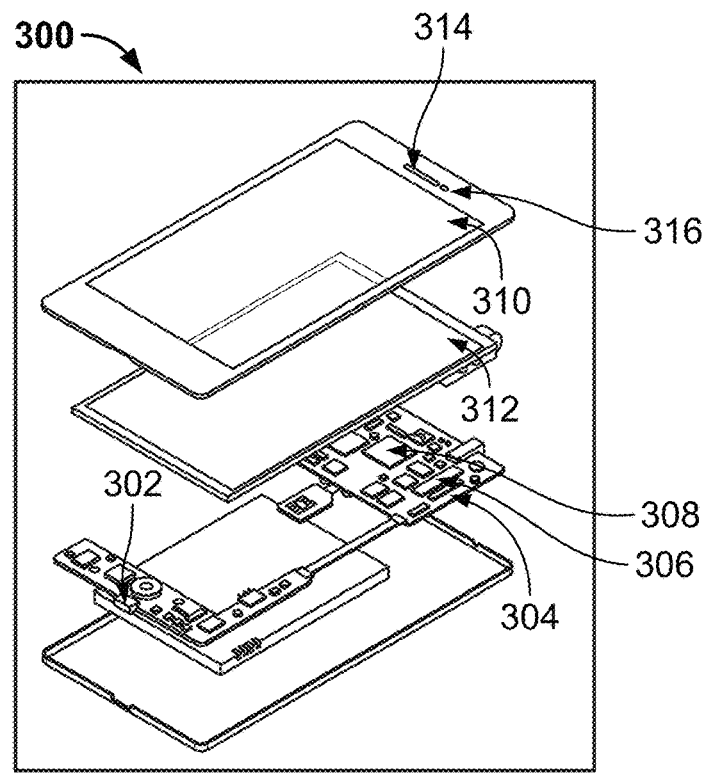
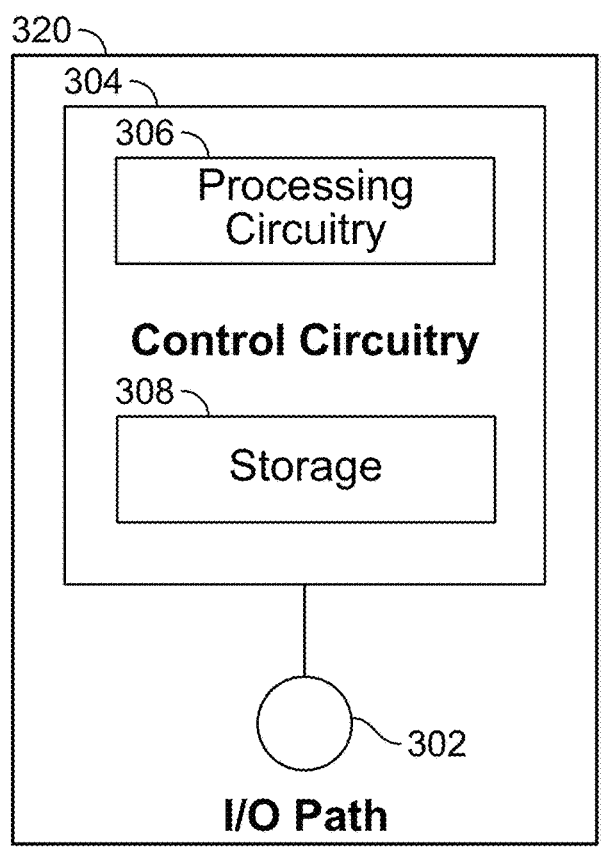
FIG. 3

SYSTEMS AND METHODS FOR PROVIDING SEARCH QUERY RESPONSES HAVING CONTEXTUALLY RELEVANT VOICE OUTPUT

CROSS REFERENCE TO RELATED APPLICATION

This application is a continuation of U.S. patent application Ser. No. 16/201,352, filed Nov. 27, 2018, which is hereby incorporated by reference herein in its entirety.

BACKGROUND

The present disclosure relates to generating responses to search queries, and more particularly, to methods and systems for providing search query responses with contextually relevant voice output.

SUMMARY

Advancements in media generation and distribution have enabled vast amounts of media content to be made available to consumers on an array of different devices and in a multitude of media formats. While consumers may enjoy having such a massive amount of media content made available to them, the amount of media content and disparate sources from which the media content is distributed make it increasingly difficult for consumers to find the content they are looking for unless they already know exactly where to look. Interactive searching tools, such as digital assistants or other applications, may be used to assist users in finding media content. Advancements in such interactive searching tools, such as natural language searching, have greatly improved the user experience of using interactive searching tools, thereby allowing a consumer to simply ask a question, and the searching tool will attempt to determine and respond with the answer. Advancements have also been made in how the interactive searching tools provide a response to a question, such as by outputting an audio response. However, interactive searching tools have only a single (or perhaps a few) predetermined voice(s) in which an audio response is provided, and can therefore be quite monotone or robotic. There exists, therefore, a need to improve the user experience of interactive searching tools by having audio responses that are more interactive and contextually relevant to the search queries provided.

Accordingly, to overcome such problems, methods and systems are disclosed herein for responding to search queries with a contextually relevant voice output. In particular, the embodiments described herein provide for generating audio output using a voice profile of a personality associated with a media content reference included in a search query. The audio response to the search query is thus provided in a voice that is contextually relevant to the search query, instead of a generic, predetermined, or otherwise unrelated voice. This greatly improves the user experience of the interactive searching tool by giving consumers the impression that they are interacting with the specific media content they are searching for instead of with a generic searching tool.

In one illustrative embodiment, a system receives a search query and identifies a media content reference included in the search query. The system then determines a personality associated with the media content reference, retrieves a voice profile of the personality, and synthesizes a search query response using the voice of the personality. For example, the system may receive the search query "Where can I watch Barney." The system then identifies the media content reference "Barney" in the search query, and determines that "Barney" is a reference to the show "Barney and Friends." The system may then consult a database to determine which performers (e.g., voice actors) provide the voices for the characters in "Barney and Friends," and select a voice profile of one of the voice actors to be used to synthesize an audio response to the search query.

In another illustrative embodiment, the system determines whether at least a portion of the response to the search query has previously been recorded by the personality, and includes such recordings in the audio response instead of synthesizing the corresponding audio. For example, advertisements for movies or television shows often include voice clips of cast members inviting consumers to watch their shows. Portions of such voice clips may be used instead of, or to supplement, synthesized audio when generating the audio response to the search query. Thus, the system may synthesize audio only for portions of the audio response that were not pre-recorded by the personality.

The present disclosure further describes methods and systems for determining characteristics of a personality's voice based on a voice profile, and modifying, based on the characteristics, audio templates corresponding to words included in an answer to the search query. The methods and systems may further identify a keyword or phrase associated with the media content reference, and include a recording or synthesized audio of the keyword or phrase in the audio response.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 shows a diagram of illustrative devices of the system of FIG. 2, in accordance with some embodiments of the disclosure;

DETAILED DESCRIPTION

Figure 1:
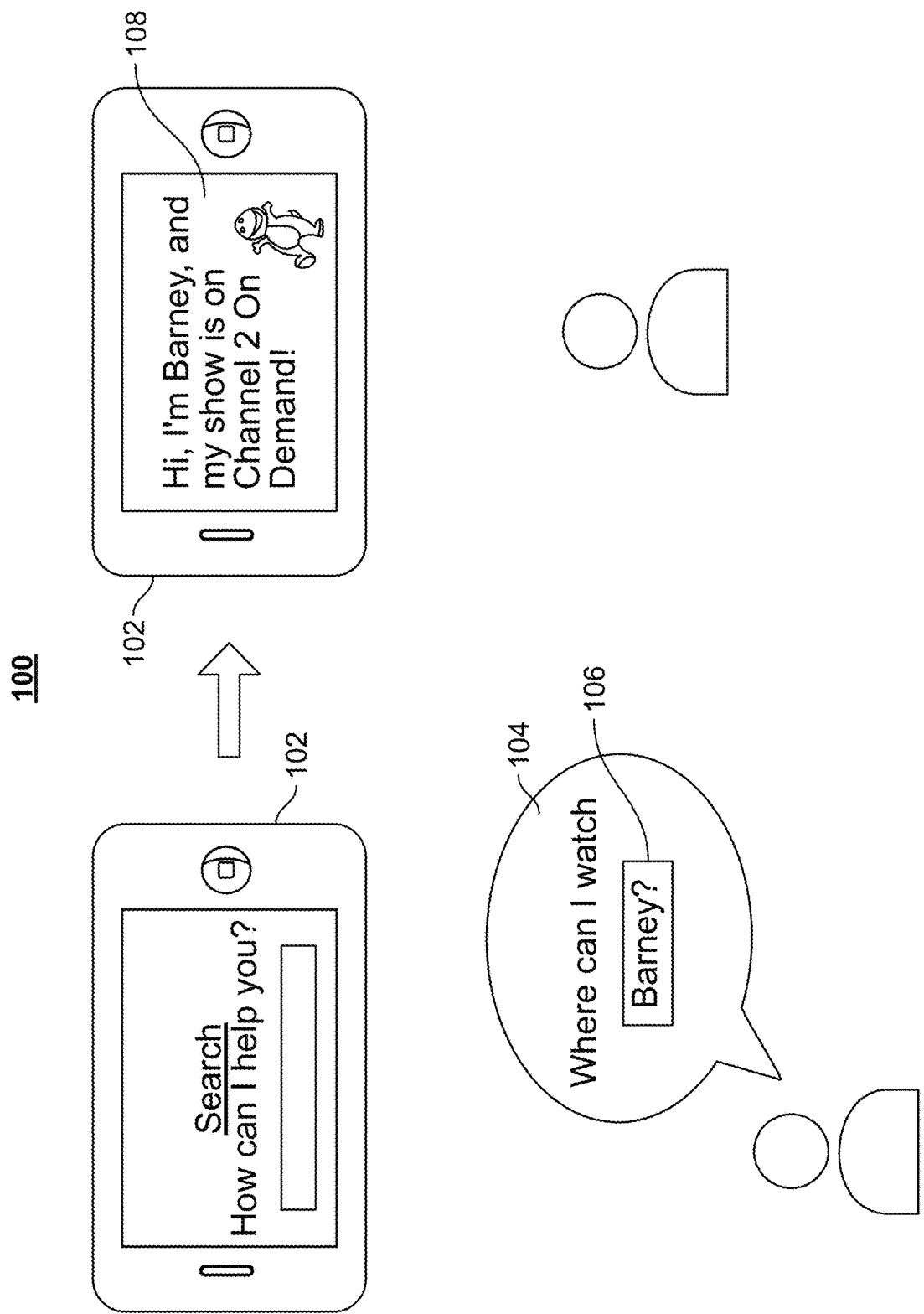
FIGS. 1A and 1B show an illustrative scenario for providing contextually relevant voice output in response to a search query, in accordance with some embodiments of the disclosure.

FIGS. 1A and 1B show an illustrative scenario 100 for providing contextually relevant voice output in response to a search query. In FIG. 1A, a media device 102 receives a search query 104 from a user. The media device 102 may be any device usable as an interactive searching tool, such as a smart television, a set-top box, an integrated receiver decoder (IRD) for handling satellite television, a digital media receiver (DMR), a streaming media device, a personal computer (PC), a laptop computer, a tablet computer, a WebTV box, a personal computer television (PC/TV), a handheld computer, a personal digital assistant (PDA), a smartphone, a wearable computer, an augmented and/or virtual reality display device, and/or any other computing equipment configured to operate as a searching tool or execute a searching tool application. In some embodiments, the media device 102 also retrieves and/or outputs the searched-for media content, while in other embodiments a separate media device (not shown in FIG. 1A or 1B) may be used to retrieve and/or output the searched-for media content.

The search query 104 includes a media content reference 106. For example, the search query 104 may be a natural language voice prompt spoken by a user and detected as input by the media device 102. The media device 102 then processes the voice prompt (such as via digital signal processing, audio template matching, etc.) to identify the words included in the voice prompt and identifies the media content reference 106 based on the words included in the voice prompt (e.g., via keyword matching). In some embodiments, the search query 104 is textual input and/or a selection (such as via voice, touch, or another user input device) of a predetermined search option. While FIG. 1A shows the search query 104 being received directly from a user, those skilled in the art will appreciate that the search query 104 may be received by and relayed via one or more intermediary devices, such as a passive-listening device, a remote control associated with the media device 102, etc.

In response to receiving the search query 104 and identifying the media content reference 106, the media device 102, in FIG. 1B, generates an audio response 108 to the search query using a voice associated with the media content reference, as further described below with reference to FIGS. 4-9. The audio response 108 is then output to the user.

Figure 2:
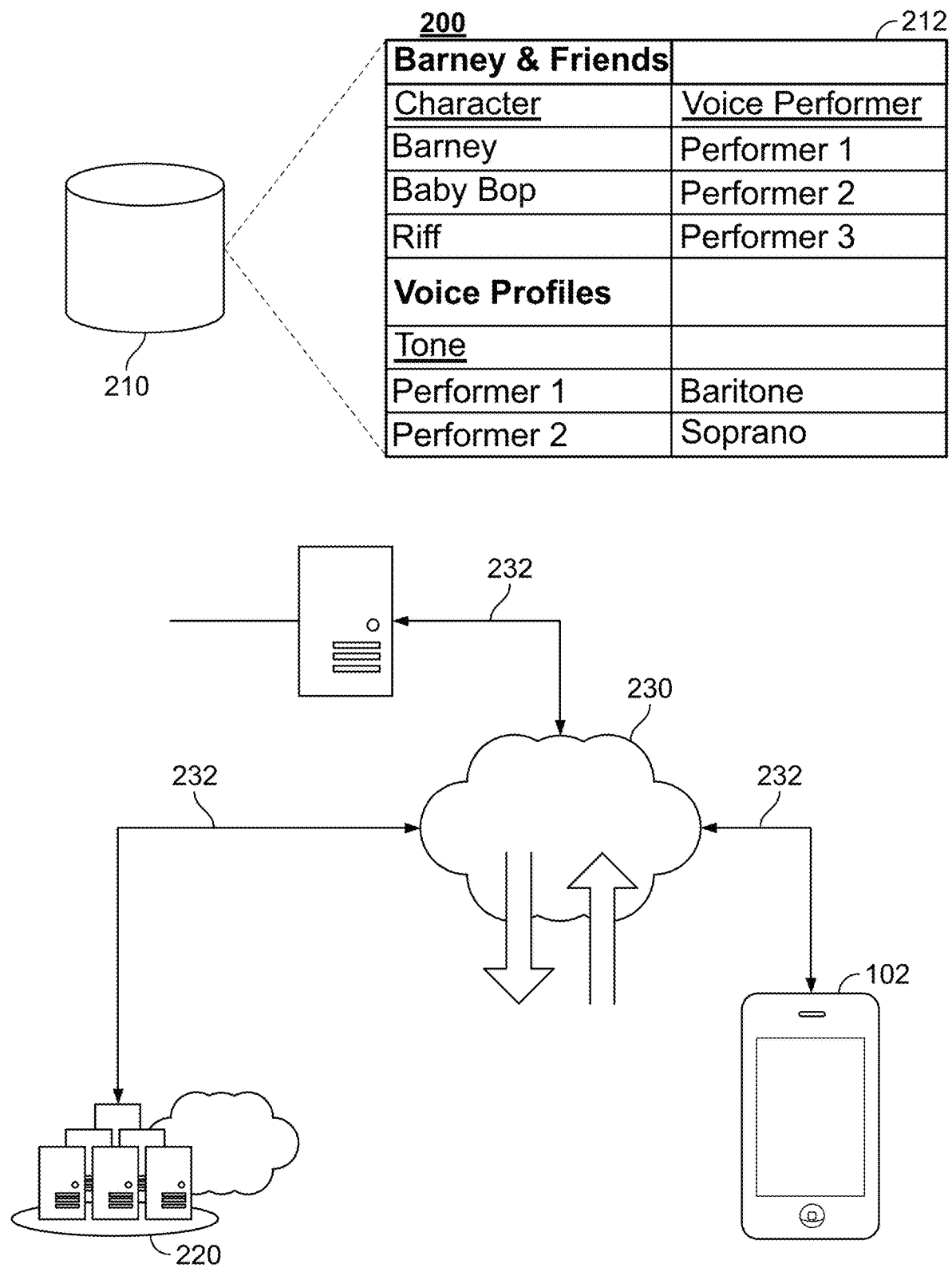
FIG. 2 shows an illustrative system for providing contextually relevant voice output in response to a search query, in accordance with some embodiments of the disclosure.

Turning now to FIG. 2, there is shown an illustrative system for providing contextually relevant voice output in response to a search query. In particular, FIG. 2 shows a system 200 where the media device 102 retrieves a voice profile associated with the media content reference 106 from a content source 210 via a communication link 232. The content source 210 may be any server, broadcasting, or transmission equipment by means of which a content provider provides voice profiles, voice clips, and/or related metadata associated with media content, either in addition to or separate from the media content, to the media device 102. In that regard, the communication link 232 may be any network or communication equipment or medium by means of which the media device 102 can communicate (e.g., submit a query to and/or retrieve data or content from) the content source 210. In one illustrative example, the communication link 232 includes devices connected via the Internet.

An interactive searching application may be implemented on any one or a combination of the media device 102, the content source 210, and/or an application server 220, each of which may function as a stand-alone device or may be part of a network of devices. Various network configurations of devices may be implemented and are discussed in more detail below. In the system 200, there may be multiple media devices 102, but only one is shown in FIG. 2 to avoid overcomplicating the drawing. In addition, multiple users may each utilize more than one type of media device 102 and also more than one of each type of media device 102, as described above.

The media device 102 may be coupled to a communication network 230. The communication network 230 may be one or more networks including the Internet, a mobile phone network, mobile voice or data network (e.g., a 4G or LTE network), cable network, public switched telephone network, or other types of communications network or combinations of communications networks. The media device 102, the content source 210, and the application server 220 may be connected to the communication network 230 via one or more communications paths 232, such as a satellite path, a fiber-optic path, a cable path, a path that supports Internet communications (e.g., IPTV), free-space connections (e.g., for broadcast or other wireless signals), and/or any other suitable wired or wireless communications path or combination of such paths.

Although communications paths 232 are not drawn directly between the media device 102 and the content source 210 or the application server 220, these devices may communicate directly with each other via communication paths 232, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The devices may also communicate with each other directly through an indirect path via the communication network 230.

The system 200 may include more than one content source 210, but only one is shown in FIG. 2 to avoid overcomplicating the drawing. The content source 210 includes a database 212 storing metadata and/or other information regarding media content and voice profiles associated with the media content. For example, as shown in FIG. 2, the database 212 includes an entry for a particular media content "Barney & Friends" listing a number of characters included in the media content and the performers providing voices for the various characters. In addition, the database 212 includes entries listing characteristics of the performers' voices. The content source 210, either in the database 212 or in a separate data structure, further stores voice profiles and/or voice clips associated with each of the performers listed in the database 212. The content source 210 may also include a remote media server used to store different types of content (e.g., the voice profiles and/or voice clips), in a location remote from any of the media devices.

Metadata may include information regarding the media content, user preferences, user profile information, media listings, media-related information (e.g., transmission times, channels, titles, descriptions, genre or category information, cast or character information, websites, etc.), and/or any other type of data that may be used to respond to a search query 104, identify a media content reference 106 in a search query 104, and/or identify a performer providing a voice of a character related to the media content reference 106.

The interactive searching application may be, for example, a stand-alone application implemented on the media device 102 described above. For example, the interactive searching application may be implemented as software or a set of executable instructions which may be stored in storage 308 (described below with reference to FIG. 3) and executed by control circuitry 304 (described below with reference to FIG. 3) of the media device 102. In some embodiments, the interactive searching application is a client/server-based application where only a client application resides on the media device 102, and a server application resides on the application server 220. For example, an interactive searching application may be implemented partially as a client application on the control circuitry 304 of the media device 102 and partially on the application server 220 as a server application running on the control circuitry 304 of the application server 220. When executed by the control circuitry 304 of the application server 220, the interactive searching application may instruct the control circuitry 304 of the content source to transmit a voice profile or audio clip related to the media content reference 106 to the application server 220. The server application may further instruct the control circuitry of the application server 220 to generate the interactive searching application output (e.g., the audio response 108) and transmit the generated audio response 108 to the media device 102. The client application may instruct the control circuitry 304 of the receiving media device 102 to generate and/or output the audio response 108.

The media device 102 may operate in a cloud computing environment to access cloud services. In a cloud computing environment, various types of computing services for content sharing, storage or distribution (e.g., informational sites or social networking sites) are provided by a collection of network-accessible computing and storage resources, referred to as "the cloud." Cloud resources may be accessed by the media device 102 using, for example, a web browser, a desktop application, a mobile application, and/or any combination of access applications of the same. The media device 102 may be a cloud client that relies on cloud computing for application delivery, or the media device 102 may have some functionality without access to cloud resources. For example, some applications running on the media device 102 may be cloud applications, that is, applications delivered as a service over the Internet, while other applications may be stored and run on the media device 102. In some embodiments, the media device 102 uses cloud resources for processing operations, such as the processing operations performed by the processing circuitry 306 described in relation to FIG. 3.

FIG. 3 shows a generalized embodiment of an illustrative media device 300. As depicted, the media device 300 may be a smartphone or tablet. The media device 300 may receive content and data via an input/output (hereinafter "I/O") path 302. The I/O path 302 may provide metadata, voice profiles, and/or voice clips to control circuitry 304, which includes processing circuitry 306 and storage 308. The control circuitry 304 may send and receive commands, requests, and other suitable data using the I/O path 302. The I/O path 302 may connect the control circuitry 304 (and specifically the processing circuitry 306) to one or more communications paths (described below). I/O functions may be provided by one or more of these communications paths, but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 304 executes instructions for an interactive searching application stored in memory (i.e., the storage 308). Specifically, the control circuitry 304 may be instructed by the interactive searching application to perform audio processing, retrieve data and/or voice profiles or voice clips, and/or perform the other functions discussed above and below.

In client/server-based embodiments, the control circuitry 304 includes communications circuitry suitable for communicating with an interactive searching application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of media devices, or communication of media devices in locations remote from each other.

Memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, hard drives, optical drives, solid state devices, quantum storage devices, or any other suitable fixed or removable storage devices, and/or any combination of the same. Nonvolatile memory may also be used (e.g., to launch a boot-up routine and other instructions). Cloud-based storage, described in relation to FIG. 2, may be used to supplement the storage 308 or instead of the storage 308.

The control circuitry 304 may include audio processing circuitry and/or audio generation circuitry, other digital encoding or decoding circuitry, or any other suitable audio circuits or combinations of such circuits. Encoding circuitry (e.g., for converting received audio input or digital signals to audio signals for analysis or storage) may also be provided. The audio circuitry may be used by the media device 300 to receive, process, and generate audio input (e.g., the search query 104) or output (e.g., the audio response 108). The circuitry described herein, including, for example, audio generating, encoding, decoding, encrypting, decrypting, and analog/digital circuitry, may be implemented using software running on one or more general purpose or specialized processors. Multiple circuits may be provided to handle simultaneous processing functions. If the storage 308 is provided as a separate device from the media device 300, the circuitry may be associated with the storage 308.

A user may send instructions to the control circuitry 304 using a user input interface 310 of the media device 300. The user input interface 310 may be any suitable user interface, such as a remote control, mouse, trackball, keypad, keyboard, touchscreen, touchpad, stylus input, joystick, or other user input interfaces. Display 312 may be a touchscreen or touch-sensitive display. In such circumstances, user input interface 310 may be integrated with or combined with the display 312. A camera, microphone 316, or other visual or voice recognition interface may also be used to receive user input (e.g., voice prompts). Speakers 314 may be provided as integrated with other elements of the media device 300.

The interactive searching application may be implemented using any suitable architecture. For example, it may be a stand-alone application wholly implemented on the media device 300. The interactive application and/or any instructions for performing any of the embodiments discussed herein may be encoded on computer-readable media. Computer-readable media includes any media capable of storing data. In some embodiments, the interactive searching application is a client/server-based application. Data for use by a thick or thin client implemented on the media device 300 is retrieved on demand by issuing requests to a server remote to the media device 300, as described above. For example, the media device 300 may receive inputs from the user via the input interface 310 or the microphone 316 and transmit those inputs to the remote server (e.g., the application server 220) for processing and generating the corresponding outputs. The generated output is then transmitted to the media device 300 to be output to the user. Those skilled in the art will appreciate that media device 102 of FIG. 1 may be implemented as media device 300 of FIG. 3.

Figure 4:
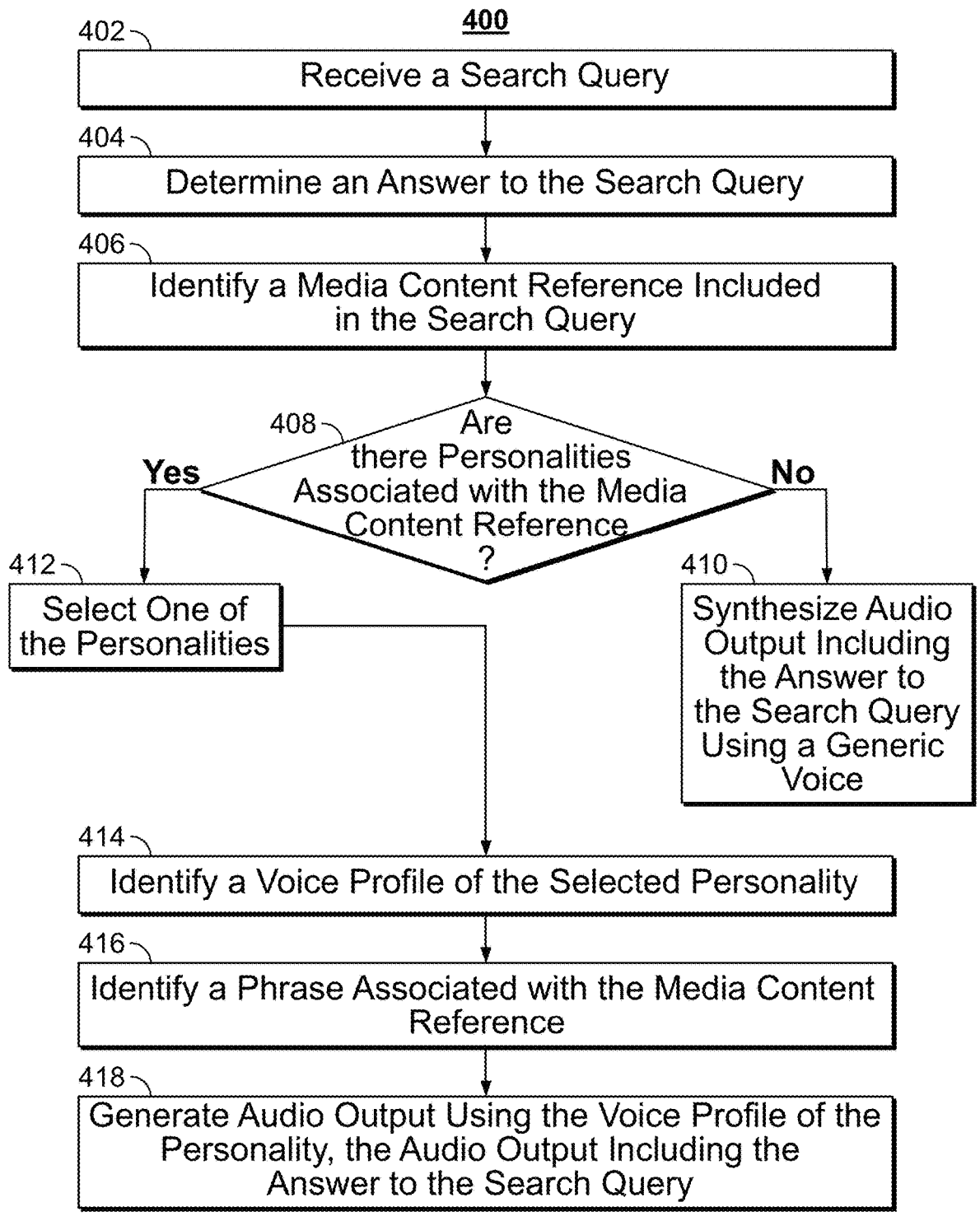
FIG. 4 is a flowchart of an illustrative process for providing contextually relevant voice output in response to a search query, in accordance with some embodiments of the disclosure.

FIG. 4 is a flowchart of an illustrative process for providing contextually relevant voice output in response to a search query, in accordance with some embodiments of the disclosure. A process 400 for providing contextually relevant voice output in response to a search query 104 may begin at block 402, where control circuitry, such as the control circuitry 304, receives the search query 104. For example, the control circuitry 304 of the media device 102 may receive a voice prompt from the user via the microphone 316. The control circuitry 304 then processes the voice prompt locally at the media device 102, or transmits the voice prompt to the application server 220 to be processed remotely, to analyze the audio of the voice prompt and identify a plurality of words included in the voice prompt (e.g., by digital signal processing, audio template matching, keyword identification, etc.). Once the plurality of words are identified, the control circuitry 304 determines the search query 104 based on the plurality of words. For example, the control circuitry 304 may perform keyword matching to identify particular words or phrases, and may determine that the particular words or phrases correspond to the search query 104.

At block 404, the control circuitry 304 determines an answer to the search query 104. For example, the control circuitry 304 may query the content source 210, the database 212, or another content or information source to retrieve information that represents an answer to the search query 104. The control circuitry 304 may then generate an answer to the search query 104 based on the retrieved information. For example, the control circuitry 304 may generate an answer comprising a plurality of words based on the retrieved information. In the example shown in FIGS. 1A and 1B, the search query 104 is "Where can I watch Barney." The control circuitry 304 may retrieve information regarding a source, time, platform, etc., where Barney & Friends is available (e.g., on Channel 2 On Demand), and may generate the answer "Hi, I'm Barney, and my show is on Channel 2 On Demand!"

At block 406, the control circuitry 304 identifies the media content reference 106 included in the search query 104. For example, the control circuitry 304 processes the plurality of words included in the search query 104 to determine if one or more of the plurality of words refer to media content. In the example shown in FIG. 1A, the search query 104 is "Where can I watch Barney," in which case the word "Barney" is a reference to the media content Barney & Friends. The control circuitry 304 may thus identify the word "Barney" in the search query 104 and may query a database for media content related to the word "Barney." In some embodiments, the media content reference 106 may not be clear or could refer to multiple media content items. In such embodiments, the control circuitry 304 may further consult a user profile associated with the user to narrow down potential media content items related to the media content reference 106. For example, the control circuitry 304 may narrow down the potential media content items based on the user's age, demographics, or media consumption history.

At block 408, the control circuitry 304 determines whether there are personalities associated with the media content reference 106. For example, the control circuitry 304 may query the database 212 to determine whether there are any personalities associated with the media content reference 106 "Barney." In some embodiments, the database 212 may indicate that there are personalities associated with the media content reference when a voice profile or audio clip of a performer providing a voice for a character in the media content is available. In response to determining that there are no personalities associated with the media content reference (for example, if the media content reference 106 refers to media content for which no voice profiles or audio clips are available), the process 400 proceeds to block 410. In response to determining that there are personalities associated with the media content reference, the process 400 proceeds to block 412.

At block 410, the control circuitry 304 generates audio output including the answer to the search query (as determined at block 406) using a generic voice. For example, the control circuitry 304 may synthesize audio corresponding to the answer using a generic or predetermined voice profile, as opposed to a voice profile associated with the media content.

At block 412, the control circuitry 304 selects one of the personalities associated with the media content reference 106. For example, the personalities may be ranked in a priority order, and the control circuitry 304 may select one of the personalities based on the priority order. In another example, the control circuitry 304 may determine that a particular personality is referred to in the media content reference 106 (e.g., the media content reference is "Barney"), and the control circuitry 304 may thus select that personality as opposed to another personality also associated with the media content reference 106.

At block 414, the control circuitry 304 identifies a voice profile of the selected personality. For example, the control circuitry 304 may determine that a particular performer provides the voice for the selected personality and may retrieve a voice profile or audio clip associated with the particular performer who provides the voice for the selected personality.

At block 416, the control circuitry 304 identifies a phrase associated with the media content reference 106. For example, as described further below with reference to FIG. 9, the control circuitry 304 may query the database 212 or another content source 210 to determine whether a particular keyword, phrase, tune, or jingle is associated with the media content reference 106. The control circuitry 304 may further retrieve the phrase, tune, or jingle associated with the media content reference 106 from the database 212 or other content source 210.

At block 418, the control circuitry 304 generates audio output using the voice profile of the personality (identified at block 414). The audio output generated by the control circuitry 304 is an audio response 108 that includes the answer to the search query 104. In some embodiments, the audio response 108 further includes the phrase, tune, or jingle identified at block 416. For example, the control circuitry 304 may execute one or more speech synthesis algorithms, including diphone synthesis, domain-specific synthesis, formant synthesis, articulatory synthesis, hidden Markov models-based synthesis, and sinewave synthesis, and/or may employ deep learning neural networks to generate the audio output using the voice profile of the personality. The process for generating the audio output of the audio response 108 is further described below with reference to FIGS. 5-7.

Figure 5:
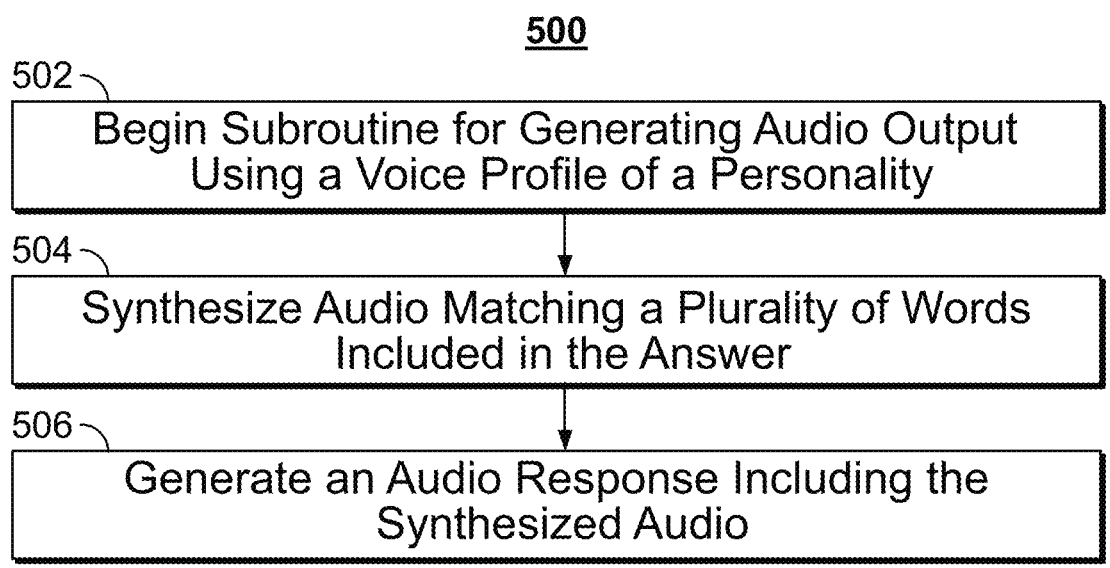
FIG. 5 is a flowchart of a detailed illustrative process for generating audio output using a voice profile of a personality, in accordance with some embodiments of the disclosure.

FIG. 5 is a flowchart of a detailed illustrative process for generating audio output using a voice profile of a personality, in accordance with some embodiments of the disclosure. A process 500 for generating audio output using a voice profile of a personality may begin at block 502.

At block 504, the control circuitry 304 synthesizes audio matching a plurality of words included in the answer. For example, as described further below with reference to FIG. 6, the control circuitry 304 retrieves the voice profile of the personality and generates audio output corresponding to the plurality of words included in the answer, as determined at block 404. In the example shown in FIG. 1B, the control circuitry 304 generates audio corresponding to the words "Hi, I'm Barney, and my show is on Channel 2 On Demand!" In some embodiments, the control circuitry 304 may further synthesize audio corresponding to the phrase associated with the media content reference 106 identified at block 416.

At block 506, the control circuitry 304 generates an audio response 108 including the synthesized audio. For example, the control circuitry 304 generates the audio response including the audio synthesized at block 504, and may further include audio corresponding to the phrase, tune, or jingle associated with the media content reference.

Figure 6:
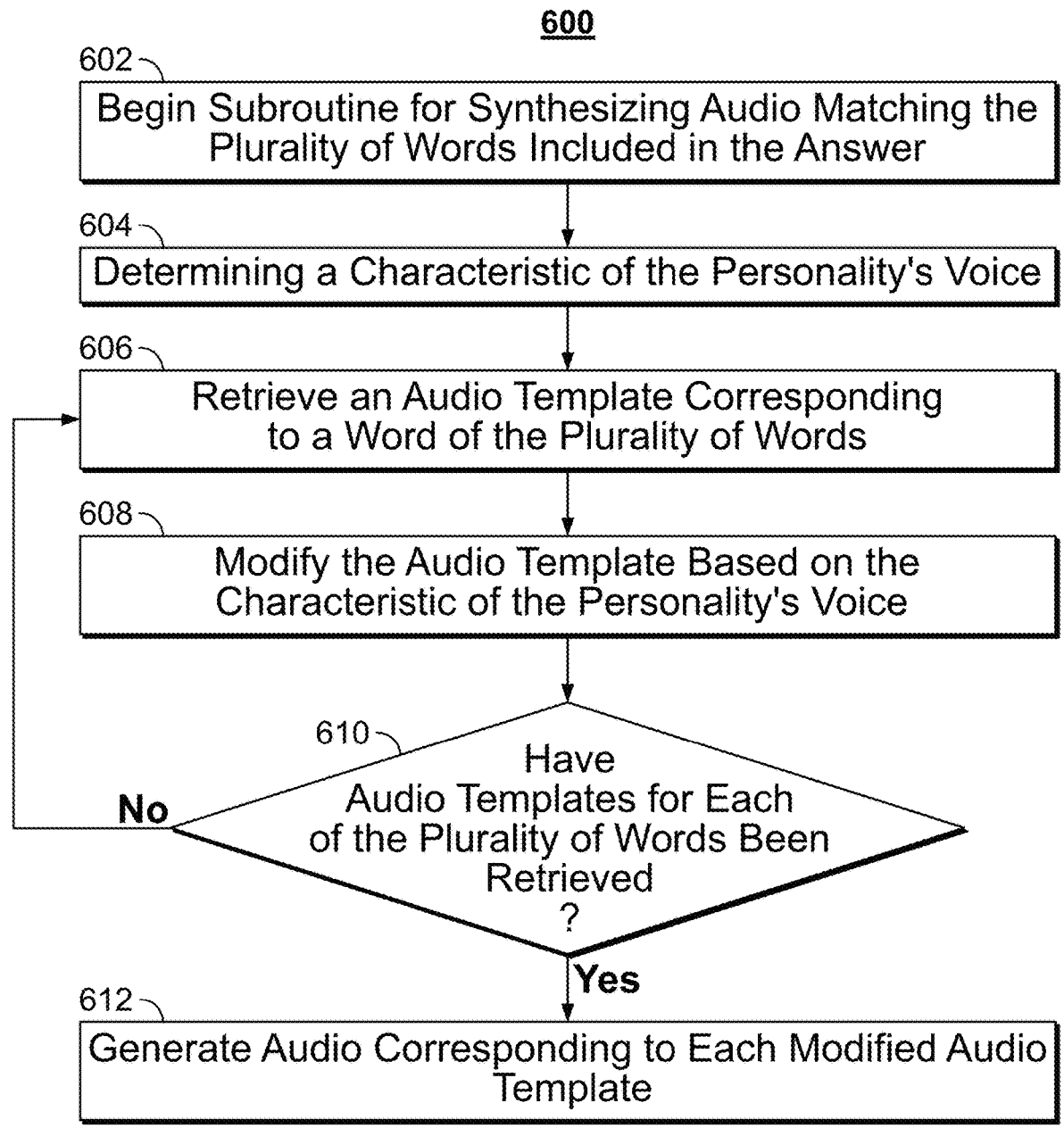
FIG. 6 is a flowchart of a detailed illustrative process for synthesizing audio matching a plurality of words included in an answer to a search query, in accordance with some embodiments of the disclosure.

FIG. 6 is a flowchart of a detailed illustrative process for synthesizing audio matching a plurality of words included in an answer to a search query, in accordance with some embodiments of the disclosure. A process 600 for synthesizing audio matching the plurality of words included in the answer may begin at block 602.

At block 604, the control circuitry 304 determines a characteristic of the personality's voice. For example, the control circuitry 304 may query the database 212 and retrieve the characteristic of the personality's voice from the database 212. In some embodiments, the characteristic is a tone, cadence, pitch, or other characteristic of the personality's voice.

At block 606, the control circuitry 304 retrieves an audio template corresponding to a word of the plurality of words included in the answer, as determined at block 404. For example, the control circuitry 304 may select one of the plurality of words included in the answer and retrieve an audio template corresponding to the selected word. The audio template may be a template based on which a generic voice will pronounce the selected word. In some embodiments, the audio templates may correspond to phrases or entire sentences instead of, or in addition to, individual words. In some embodiments, the audio templates include phonetic transcriptions and/or prosody information of the corresponding words, phrases, or sentences. In other embodiments, the control circuitry 304 generates the audio templates corresponding to each word of the plurality of words included in the answer, such as via text-to-phoneme or grapheme-to-phoneme conversion processes.

At block 608, the control circuitry 304 modifies the audio template retrieved at block 606 based on the characteristic of the personality's voice determined at block 604. For example, the control circuitry 304 may modify the tone, cadence, pitch, and/or another characteristic of the audio template to match the tone, cadence, pitch or other characteristic of the personality's voice.

At block 610, the control circuitry 304 determines whether audio templates for each of the plurality of words included in the answer have been retrieved. For example, the control circuitry 304 may compare the number of audio templates that have been retrieved with the number of words in the answer. In response to determining that audio templates have not been retrieved for each of the plurality of words included in the answer, the process 600 returns to block 606 where an audio template for another word included in the answer is retrieved. In response to determining that audio templates for all of the words included in the answer has been retrieved, the process 600 proceeds to block 612.

At block 612, the control circuitry 304 generates audio output corresponding to each modified audio template. For example, the control circuitry 304 synthesizes audio based on each modified audio template to generate the audio response 108 corresponding to the answer to the search query 104. In some embodiments, the control circuitry 304 converts the phonetic transcriptions and/or prosody information corresponding to each word included in the answer into sound.

Figure 7:
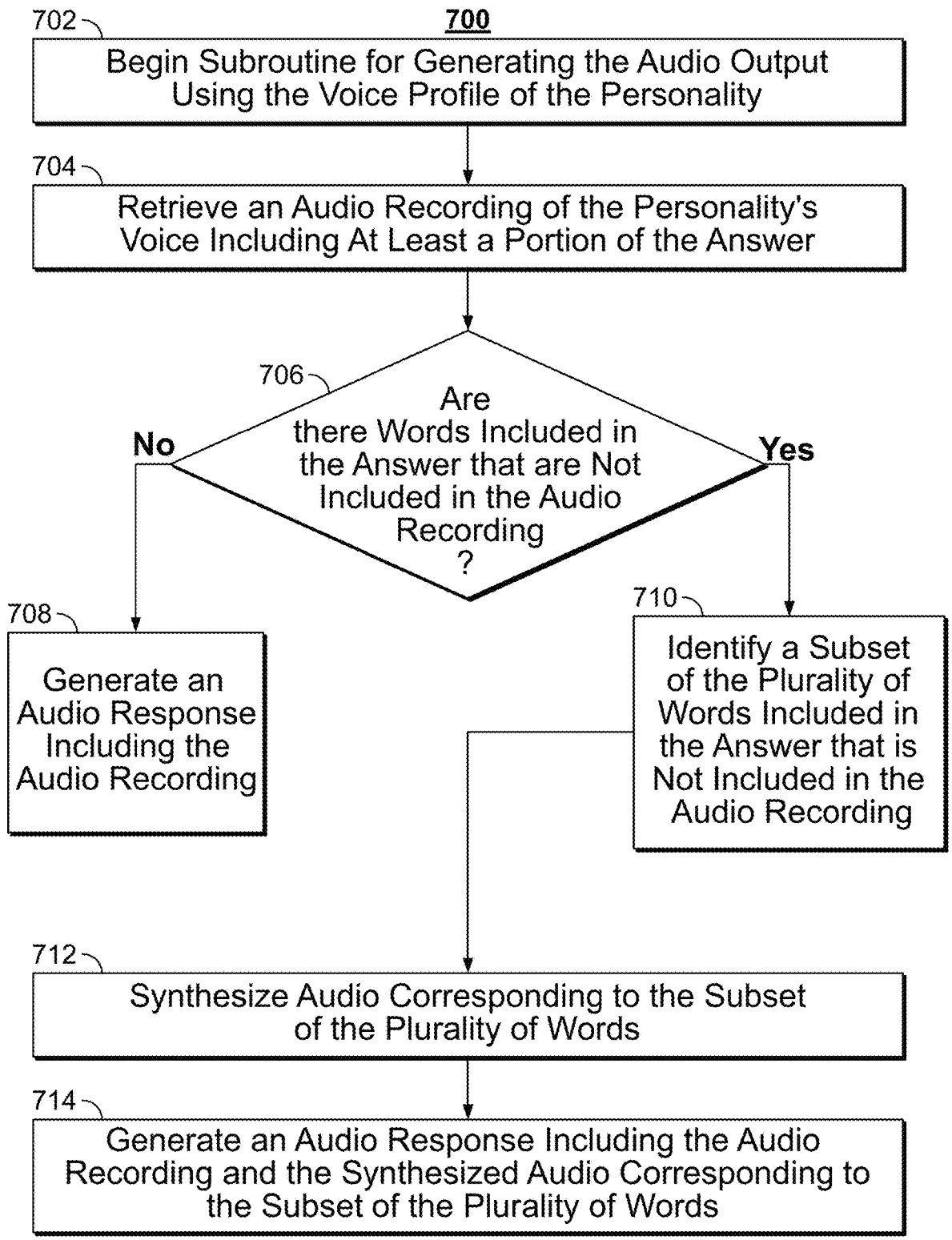
FIG. 7 is a flowchart of a detailed illustrative process for generating audio output using a voice profile of a personality associated with a media content reference, in accordance with some embodiments of the disclosure.

FIG. 7 is a flowchart of a detailed illustrative process for generating audio output using a voice profile of a personality associated with a media content reference, in accordance with some embodiments of the disclosure. A process 700 for generating the audio output using the voice profile of the personality may begin at block 702.

At block 704, the control circuitry 304 retrieves an audio recording of the personality's voice. The audio recording of the personality's voice includes at least a portion of the answer. For example, the control circuitry 304 may query the database 212 or other media content source 210 to determine whether an audio recording of the personality's voice including at least a portion of the answer is available. If such an audio recording of the personality's voice is available, the control circuitry 304 may retrieve the audio recording from the database 212 or other media content source 210. The audio recording of the personality's voice may be part of an advertisement or other promotional material for the media content, or part of the media content itself, or it may be an unrelated audio recording of the personality's voice that happens to include a portion of the answer.

At block 706, the control circuitry 304 determines whether there are words included in the answer that are not included in the audio recording of the personality's voice.

For example, the control circuitry 304 may determine whether the words included in the audio recording of the personality's voice include all the words necessary to generate the audio response 108 to the search query 104. In some embodiments, the control circuitry 304 compares the words included in the audio recording with the words included in the answer and determines whether there is a complete match of all the words and/or the sequence of the words. In other embodiments, the control circuitry 304 determines whether the words included in the audio recording are sufficient to provide an answer to the search query 104 even if the words included in the audio recording are different from the plurality of words included in the answer. In response to determining that all the words included in the answer are also included in the audio recording, and thus that the audio recording is a sufficient audio response 108 to the search query 104, the process 700 proceeds to block 708. In response to determining that there are words included in the answer that are not included in the audio recording, the process 700 proceeds to block 710.

At block 708, the control circuitry 304 generates an audio response 108 including the audio recording retrieved at block 704. For example, the control circuitry 304 may select the audio recording as the audio response 108. In some embodiments where the portion of the audio recording used for the answer is a snippet of a larger audio recording, the control circuitry 304 may modify one or more words included in the audio recording (such as by modifying the tone, cadence, or pitch, etc., of one or more of the words) to ensure the audio recording sounds like a complete sentence.

At block 710, the control circuitry 304 identifies a subset of the plurality of words included in the answer that is not included in the audio recording. For example, the control circuitry 304 may compare the words included in the answer with the words included in the audio recording and identify one or more words that are not included in the audio recording.

At block 712, the control circuitry 712 synthesizes audio corresponding to the subset of the plurality of words identified at block 710. For example, the control circuitry 304 may synthesize audio for only those words included in the answer and not included in the audio recording. In an example embodiment where the answer includes the words "Hi, I'm Barney, and my show is on Channel 2 On Demand," the words "Hi, I'm Barney" may be included in the audio recording while the words "and my show is on Channel 2 On Demand" may not be included in the audio recording. In such an embodiment, the control circuitry 304 may only synthesize audio corresponding to the words "and my show is on Channel 2 On Demand" while using the audio recording for the words "Hi, I'm Barney."

At block 714, the control circuitry 304 generates an audio response 108 including the audio recording and the synthesized audio corresponding to the subset of the plurality of words. For example, the control circuitry 304 may generate the audio response by combining the audio recording retrieved at block 704 with the audio synthesized at block 712.

Figure 8:
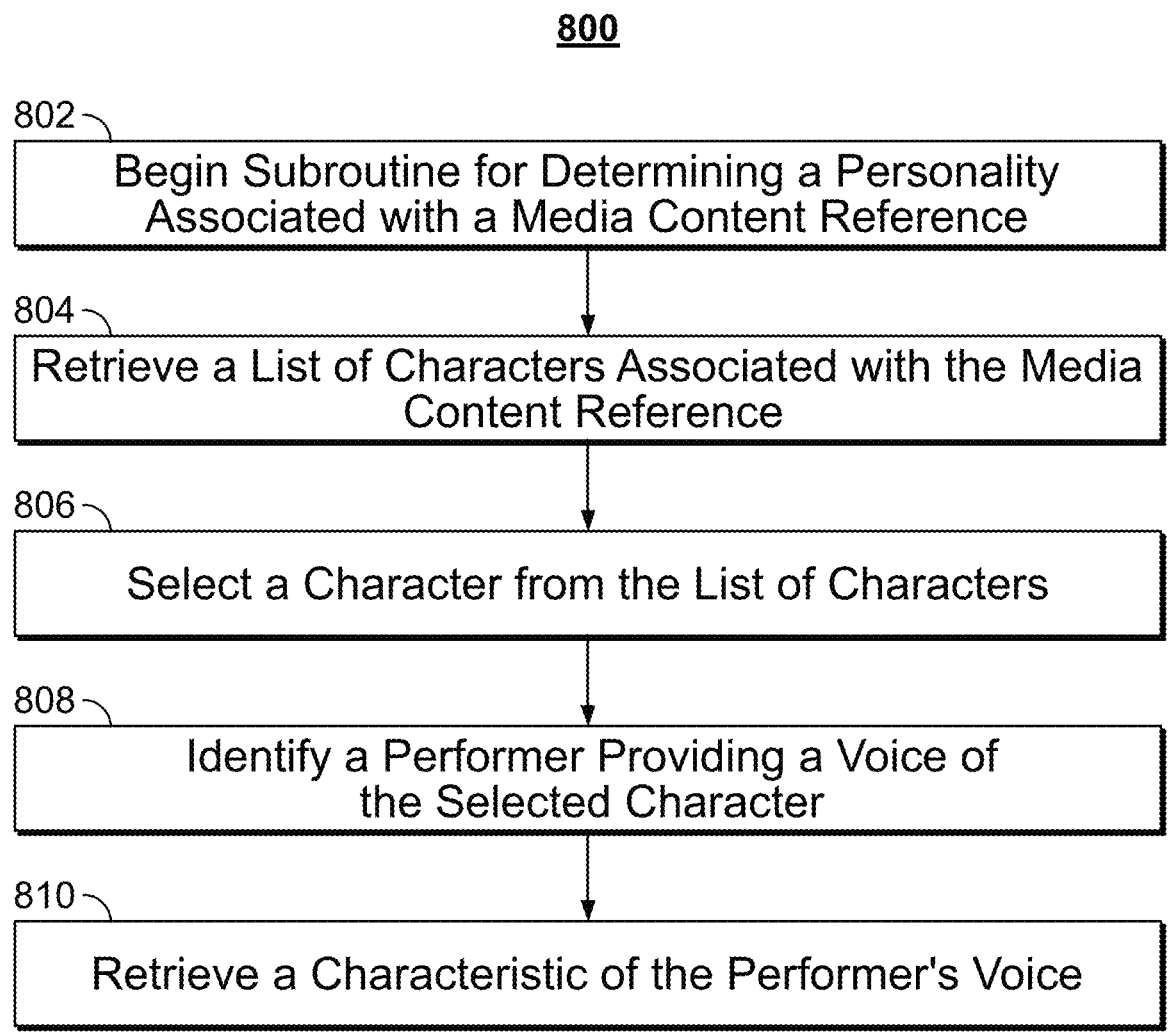
FIG. 8 is a flowchart of another detailed illustrative process for determining a personality associated with a media content reference, in accordance with some embodiments of the disclosure.

FIG. 8 is a flowchart of another detailed illustrative process for determining a personality associated with a media content reference, in accordance with some embodiments of the disclosure. A process 800 for determining a personality associated with a media content reference may begin at block 802.

At block 804, the control circuitry 304 retrieves a list of characters associated with the media content reference. For example, the control circuitry 304 may query the database 212 for characters associated with the media content reference identified at block 406, and may retrieve a list of the characters from the database 212.

At block 806, the control circuitry 304 selects a character from the list of characters. For example, the characters may be ranked in a priority order and the control circuitry 304 may select one of the characters based on the priority order. In another example, the control circuitry 304 may determine that a particular character is referred to in the media content reference 106 (e.g., the media content reference is "Barney"), and the control circuitry 304 may thus select that character as opposed to another character also associated with the media content reference 106.

At block 808, the control circuitry 304 identifies a performer providing a voice of the selected character. For example, the control circuitry 304 may query the database 212 for the name of a performer who provides the voice for the selected character.

At block 810, the control circuitry 304 retrieves a characteristic of the performer's voice. For example, the control circuitry 304 may query the database 212 for a characteristic of the performer's voice and may retrieve the characteristic from the database 212. In some embodiments, the characteristic of the performer's voice is a tone, cadence, pitch, and/or other characteristic of the performer's voice.

Figure 9:
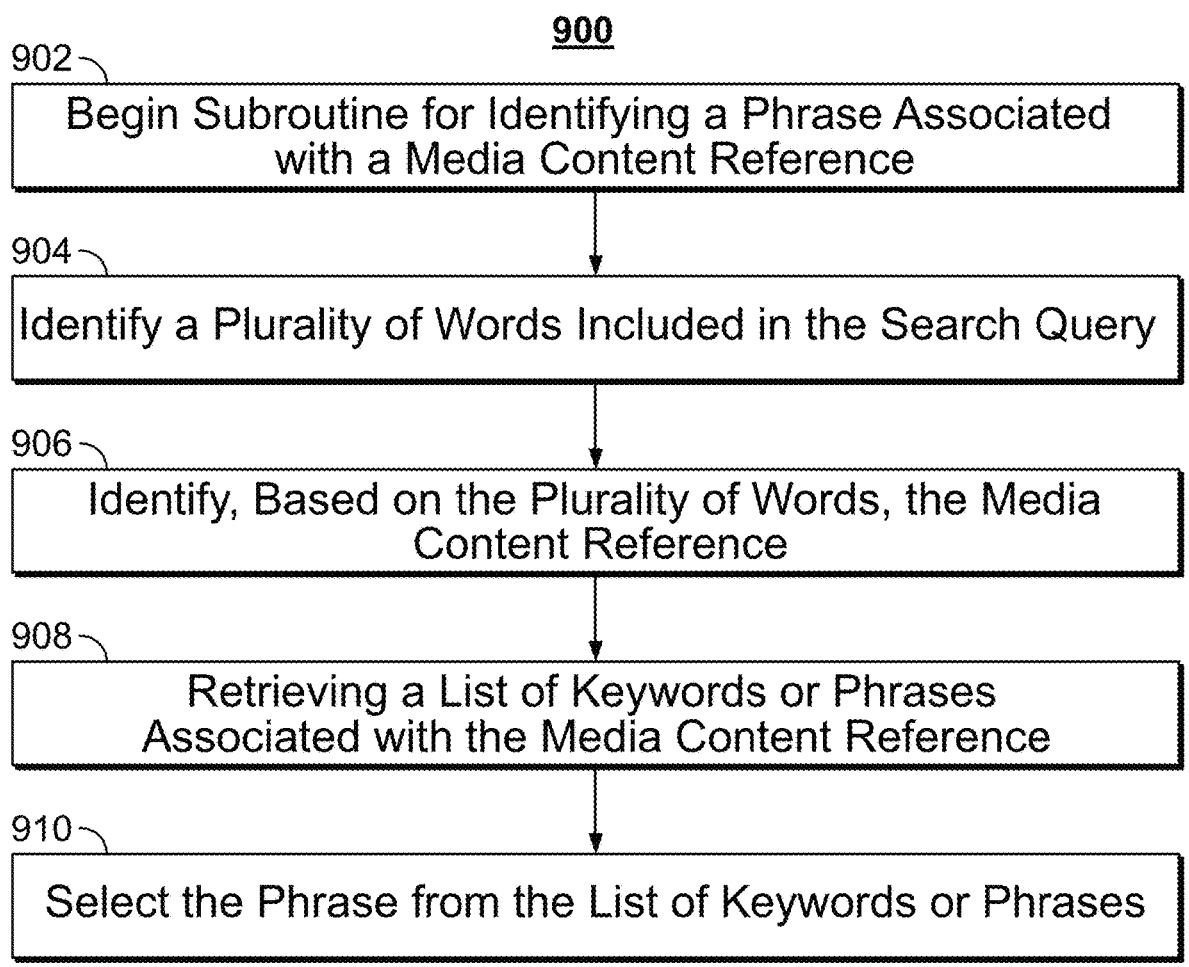
FIG. 9 is a flowchart of a detailed illustrative process for identifying a phrase associated with a media content reference, in accordance with some embodiments of the disclosure.

FIG. 9 is a flowchart of a detailed illustrative process for identifying a phrase associated with a media content reference, in accordance with some embodiments of the disclosure. A process 900 for identifying a phrase associated with a media content reference may begin at block 902.

At block 904, the control circuitry 304 identifies a plurality of words included in the search query. For example, as described above with reference to block 402, the control circuitry 304 may process the voice prompt received at block 402 to analyze the audio of the voice prompt and identify a plurality of words included in the voice prompt (e.g., by digital signal processing, audio template matching, keyword identification, etc.).

At block 906, the control circuitry 304 identifies, based on the plurality of words identified at block 904, the media content reference 106. For example, as described above with reference to block 406, the control circuitry 304 may process the plurality of words included in the search query 104 to determine if one or more of the plurality of words refer to media content. In some embodiments, the control circuitry 304 may compare one or more of the plurality of words included in the search query 104 with a database of words or phrases that have previously been determined to refer to particular media content, and if a word or phrase included in the search query 104 matches one of the words or phrases from the database, the control circuitry 304 may determine that those words or phrases are references to the particular media content.

At block 908, the control circuitry 304 retrieves a list of keywords or phrases associated with the media content reference. For example, the database 212 may include a list of keywords, phrases, tunes, or jingles associated with particular media content, and the control circuitry 304 may query the database 212 or another content source 210 to determine whether particular keywords, phrases, tunes, or jingles are associated with the media content reference 106. The control circuitry 304 may then retrieve a list of the keywords, phrases, tunes, or jingles associated with the media content reference 106 from the database 212 or other content source 210.

At block 910, the control circuitry 304 selects a phrase from the list of keywords or phrases associated with the media content reference. For example, the control circuitry 304 may select the phrase based on a preference of the user, a popularity of the phrase, etc.

It should be noted that processes 400-900 or any step thereof could be performed on, or provided by, any of the devices shown in FIGS. 1-3. For example, the processes may be executed by control circuitry 304 (FIG. 3) as instructed by an interactive searching application implemented on a media device 102, a content source 210, and/or an application server 220. In addition, one or more steps of a process may be omitted, modified, and/or incorporated into or combined with one or more steps of any other process or embodiment (e.g., steps from process 600 may be combined with steps from process 800). In addition, the steps and descriptions described in relation to FIGS. 4-9 may be done in alternative orders or in parallel to further the purposes of this disclosure. For example, each of these steps may be performed in any order or in parallel or substantially simultaneously to reduce lag or increase the speed of the system or method.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A computer-implemented method comprising:
receiving input;
determining that the input includes a reference to a video content item;
in response to determining that the input includes the reference to the video content item:
querying a voice profile database to identify a voice performer included in a cast of the video content item referenced in the input, wherein the voice profile database comprises a plurality of voice profiles of a plurality of voice performers, and the voice profile database comprises, for each respective voice performer of the plurality of voice performers, an indication of a video content item that the respective voice performer is included in a cast of;
determining that the voice profile database comprises a voice profile of the identified voice performer; and
in response to (a) identifying the voice performer included in the cast of the video content item referenced in the input and (b) determining that the voice profile database comprises the voice profile of the identified voice performer:
generating output in a voice of the identified voice performer using the voice profile of the identified voice performer stored at the database.

2. The method of claim 1, wherein generating the output comprises:
determining a textual form of the output, the textual form including a plurality of words;
synthesizing, using the voice profile of the identified voice performer, audio matching at least a portion of the plurality of words; and
generating the output as an audio output based on the synthesized audio.

3. The method of claim 2, wherein synthesizing, using the voice profile of the identified voice performer, audio matching at least a portion of the plurality of words comprises:
determining, based on the voice profile of the identified voice performer, a characteristic of the voice of the identified voice performer;
identifying a plurality of audio templates, wherein each audio template of the plurality of audio templates corresponds to a respective word of the plurality of words;
modifying each audio template of the plurality of audio templates based on the characteristic of the voice of the identified voice performer; and
generating audio corresponding to each modified audio template.

4. The method of claim 2, further comprising:
identifying an audio recording of the voice of the identified voice performer, wherein the audio recording includes at least one of the plurality of words, and
wherein the generating of the audio output is performed based on the synthesized audio and the audio recording.

5. The method of claim 4, further comprising:
identifying one or more words of the plurality of words that are not included in the audio recording,
wherein synthesizing the audio matching at least a portion of the plurality of words comprises synthesizing audio corresponding to the one or more words of the plurality of words that are not included in the audio recording.

6. The method of claim 1, wherein generating the output in the voice of the identified voice performer using the voice profile of the identified voice performer comprises:
retrieving, from the voice profile database, an audio recording of the identified voice performer; and
generating the output based at least in part on the audio recording.

7. The method of claim 1, wherein determining that the voice profile database comprises the voice profile of the identified voice performer comprises:
retrieving, from the voice profile database, an indication of a character associated with the video content item identified by the reference to the video content item; and
determining the voice performer provides a voice of the character.

8. The method of claim 1, wherein the identified voice performer corresponds to a character in the video content item, and an indication of the character is included in a title of the video content item.

9. The method of claim 1, further comprising:
identifying a particular keyword, phrase, tune, or jingle associated with the video content item, wherein the generated output includes the particular keyword, phrase, tune, or jingle associated with the video content item.

10. The method of claim 1, wherein the input is a search query, and the output is an answer to the search query.

11. A system comprising:
a voice profile database:
control circuitry configured to:
   receive input;
   determine that the input includes a reference to a video content item;
   in response to determining that the input includes the reference to the video content item:
      query the voice profile database to identify a voice performer included in a cast of the video content item referenced in the input, wherein the voice profile database comprises a plurality of voice profiles of a plurality of voice performers, and the voice profile database comprises, for each respective voice performer of the plurality of voice performers, an indication of a video content item that the respective voice performer is included in a cast of;
      determine that the voice profile database comprises a voice profile of the identified voice performer; and
      in response to (a) identifying the voice performer included in the cast of the video content item referenced in the input and (b) determining that the voice profile database comprises the voice profile of the identified voice performer:
         generate output in a voice of the identified voice performer using the voice profile of the identified voice performer stored at the database.

12. The system of claim 11, wherein the control circuitry is configured to generate the output by:
   determining a textual form of the output, the textual form including a plurality of words;
   synthesizing, using the voice profile of the identified voice performer, audio matching at least a portion of the plurality of words; and
   generating the output as an audio output based on the synthesized audio.

13. The system of claim 12, wherein the control circuitry is configured to synthesize, using the voice profile of the identified voice performer, audio matching at least a portion of the plurality of words by:
   determining, based on the voice profile of the identified voice performer, a characteristic of the voice of the identified voice performer;
   identifying a plurality of audio templates, wherein each audio template of the plurality of audio templates corresponds to a respective word of the plurality of words;
   modifying each audio template of the plurality of audio templates based on the characteristic of the voice of the identified voice performer; and
   generating audio corresponding to each modified audio template.

14. The system of claim 12, wherein the control circuitry is further configured to:
   identify an audio recording of the voice of the identified voice performer, wherein the audio recording includes at least one of the plurality of words; and
   generate the audio output based on the synthesized audio and the audio recording.

15. The system of claim 14, wherein the control circuitry is further configured to:
   identify one or more words of the plurality of words that are not included in the audio recording; and
   synthesize the audio matching at least a portion of the plurality of words by synthesizing audio corresponding to the one or more words of the plurality of words that are not included in the audio recording.

16. The system of claim 11, wherein the control circuitry is configured to generate the output in the voice of the identified voice performer using the voice profile of the identified voice performer by:
   retrieving, from the voice profile database, an audio recording of the identified voice performer; and
   generating the output based at least in part on the audio recording.

17. The system of claim 11, wherein the control circuitry is configured to determine that the voice profile database comprises the voice profile of the identified voice performer by:
   retrieving, from the voice profile database, an indication of a character associated with the video content item identified by the reference to the video content item; and
   determining the voice performer provides a voice of the character.

18. The system of claim 11, wherein the identified voice performer corresponds to a character in the video content item, and an indication of the character is included in a title of the video content item.

19. The system of claim 11, wherein the control circuitry is further configured to:
   identify a particular keyword, phrase, tune, or jingle associated with the video content item; and
   generate the output to include the identified particular keyword, phrase, tune, or jingle associated with the video content item.

20. The method of claim 1, wherein:
   the method further comprises providing a machine learning model; and
   the generating of the output in the voice of the identified voice performer using the voice profile of the identified voice performer stored at the database is performed using the machine learning model.

* * * * *